United States Patent
Hisha et al.

(10) Patent No.: US 8,273,827 B2
(45) Date of Patent: Sep. 25, 2012

(54) ADHESIVE COMPOSITION AND ADHESION METHOD

(75) Inventors: Yuki Hisha, Shibukawa (JP); Kimihiko Yoda, Shibukawa (JP); Kazuhiro Oshima, Shibukawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/122,020

(22) PCT Filed: Oct. 8, 2009

(86) PCT No.: PCT/JP2009/067543
§ 371 (c)(1), (2), (4) Date: Apr. 21, 2011

(87) PCT Pub. No.: WO2010/041710
PCT Pub. Date: Apr. 15, 2010

(65) Prior Publication Data
US 2011/0190414 A1    Aug. 4, 2011

(30) Foreign Application Priority Data
Oct. 8, 2008    (JP) .................. 2008-262015

(51) Int. Cl.
C08F 8/00    (2006.01)
C08L 33/02    (2006.01)
C08L 33/04    (2006.01)
C08L 35/02    (2006.01)

(52) U.S. Cl. ........ 525/191; 525/194; 525/196; 525/221; 525/222

(58) Field of Classification Search .......... 525/191, 525/194, 196, 221, 222
See application file for complete search history.

(56) References Cited

U.S. PATENT DOCUMENTS

| | | |
|---|---|---|
| 4,348,503 A | 9/1982 | Bachmann |
| 5,283,292 A | 2/1994 | Di Ruocco et al. |

FOREIGN PATENT DOCUMENTS

| | | |
|---|---|---|
| GB | 2033415 A | 5/1980 |
| JP | 55-65277 A | 5/1980 |
| JP | 57-012039 A | 1/1982 |
| JP | 60-199085 A | 10/1985 |
| JP | 3-134080 A | 6/1991 |
| JP | 3-134081 A | 6/1991 |
| JP | 5-125331 A | 5/1993 |
| JP | 6-248238 A | 6/1994 |
| JP | 2003-165806 A | 6/2003 |
| WO | 02/48274 A2 | 6/2002 |
| WO | 2008-108273 A1 | 9/2008 |

OTHER PUBLICATIONS

International Search Report for PCT/JP2009/067543, dated Dec. 1, 2009.
Extended European Search Report issued to EP Application No. 09819244.6 mailed Mar. 6, 2012.

*Primary Examiner* — Nathan M Nutter
(74) *Attorney, Agent, or Firm* — Hoffmann & Baron, LLP

(57) ABSTRACT

Disclosed is an adhesive composition having adhesion properties, high-speed curing properties and moisture resistance. Also disclosed is an adhesion method. Specifically disclosed is a composition which comprises: a first preparation comprising (A) a nitrile-butadiene rubber, (B) a (meth)acrylic composition, (C) a compound having an enal structure, and (F) a radical polymerization initiator; and a second preparation comprising (A) the nitrile-butadiene rubber, (B) the (meth)acrylic composition, (D) a compound having an amine structure, and (E) a compound containing copper. Also disclosed is a composition which comprises: a first preparation comprising (A) a nitrile-butadiene rubber, (B) a (meth)acrylic composition, (D) a compound having an amine structure, and (F) a radical polymerization initiator; and a second preparation comprising (A) the nitrile-butadiene rubber, (B) the (meth)acrylic composition, (C) a compound having an enal structure, and (E) a compound containing copper.

20 Claims, No Drawings

US 8,273,827 B2

ADHESIVE COMPOSITION AND ADHESION METHOD

CROSS-REFERENCE TO RELATED APPLICATIONS

This application is the National Stage of international Application No. PCT/JP2009/067543, which designates the U.S., filed Oct. 8, 2009 which claims the benefit of JP 2008-262015, filed Oct. 8, 2008, the contents of which are incorporated by reference herein.

TECHNICAL FIELD

The present invention relates to a composition and an adhesion method, and relates to, for example, a two-part quick curing adhesive composition used for metal parts, ceramic parts and the like, and an adhesion method for use thereof.

BACKGROUND ART

Requests for adhesives that cure in a short period of time at ambient temperature have steadily increased due to the desire for greater production line efficiency and lower costs. Conventionally, those well-known as adhesives of a quick curing type at ambient temperature include two-part quick curing type epoxy adhesives, instant adhesives, anaerobic adhesives, non-anaerobic acryl adhesives and the like.

The two-part quick curing type epoxy adhesive is one used by weighing and mixing a base compound and a curing agent. If they are insufficiently weighed and mixed, a remarkable reduction in strength is likely. Also, even if they are sufficiently weighed and mixed, there is a drawback that peeling strength and impact strength are low.

Such an adhesive has excellent workability, but is generally low in peeling strength and impact strength, and is inferior in heat resistance and moisture resistance. Thus, the range of its use is remarkably limited.

The anaerobic adhesive is cured by pressure-bonding the adhesive between materials to be adhered to block air. Thus, as a matter of course, a portion in contact with air, such as a portion protruding from between adherends is not cured. Therefore, when the adherend is porous or shapes of the adherends between the adherends are different, an adhesion thickness is partially different, i.e., degrees of the adherends in contact with air are different. Thus, it is difficult to cure the adhesive anaerobically.

The non-anaerobic acrylic adhesive is generally referred to as a second generation acrylic adhesive (SGA), and is a two-part agent. The non-anaerobic acrylic adhesive has excellent workability in that accurate weighing of two preparations is not required and the adhesive is cured in several to several tens of minutes at ambient temperature even if the preparations are extremely roughly weighed and mixed, and has high peeling strength and impact strength. The portion protruding from between the adherends is also cured well. Thus, this is widely used.

However, requests to further shorten curing time for acrylic adhesives that require several to several tens of minutes for curing at ambient temperature have been increasing due to the desire for greater production efficiency and lower costs.

For example, the adhesive disclosed in Patent Document 1 is composed of urethane acrylate, an acrylate ester monomer, aromatic perester, an organic acid and a transition metal, and cures in 45 seconds.

Also, the adhesive disclosed in Patent Document 2 is composed of certain urethane acrylate, an acrylate ester monomer, peroxy ester and an accelerator, and cures within one minute.

It has been disclosed that the adhesive disclosed in Patent Document 3 contains chloro-sulfonated polyethylene and a particular acrylic monomer mixed at a particular ratio, further contains cumene hydroperoxide, an aldehyde-amine condensate and an oxidizing organic compound of a transition metal, and cures within several seconds.

Quick curing acrylic adhesives containing an acrylic monomer, a reaction condensate of peroxy ester and amine-aldehyde, a salt of copper and an aromatic hydroxyl group-containing compound are disclosed in Patent Documents 4 and 5. A curable composition containing a polymerizable acrylic liquid composition, cumene hydroperoxide, a reducing agent and a basic compound is disclosed in Patent Document 6.

DISCLOSURE OF THE INVENTION

Problems to be Solved by the Invention

However, any of the compounds disclosed in the above documents known publicly has a drawback in that, for example, the strength is reduced under conditions of high temperature and high humidity. Initial adhesiveness is good in the compositions in Patent Documents 4 And 5. However, it is required that the strength is not reduced under the more strict conditions of high temperature and high humidity. No compound having an enal structure is disclosed in Patent Document 6.

It is also required to obtain strong adhesiveness to an adherend without causing interfacial failure on a metal steel plate.

It is an object of the present invention to provide a composition and an adhesive having adhesion properties, high-speed curing properties and moisture resistance, and an adhesion method.

Means for Solving the Problems

That is, the present invention provides a composition containing a first preparation containing (A) a nitrile butadiene rubber, (B) a (meth)acrylic composition, (C) a compound having an enal structure and (F) a radical polymerization initiator, and a second preparation containing (A) the nitrile butadiene rubber, (B) the (meth)acrylic composition, (D) a compound having an amine structure and (E) a compound containing copper.

The present invention also provides a composition containing (A) a nitrile butadiene rubber, (B) a (meth)acrylic composition, (D) a compound having an amine structure and (F) a radical polymerization initiator, and a second preparation comprising (A) the nitrile butadiene rubber, (B) the (meth)acrylic composition, (C) a compound having the enal structure and (E) a compound containing copper.

In a first preparation, it is preferable to contain (G) a photopolymerization initiator, it is preferable that the content of acrylnitrile in component (A) is 10 to 30% by mass based on component (A), it is preferable that component (B) contains one or two or more selected from the group consisting of isobornyl (meth)acrylate, (meth)acrylic acid, 2,2-bis[4-((meth)acryloxypolyethoxy)phenyl]propane, 2,2-bis(4-(meth)acryloxyethoxyphenyl)propane and trimethylolpropane tri(meth)acrylate, it is preferable that component (B) contains isobornyl (meth)acrylate, it is preferable that component (C) is 2-ethyl-2-hexenal, it is preferable that component (D) is aniline, and it is preferable that component (E) is a reducing agent containing copper. It is preferable that the composition further contains a cohesiveness imparting agent, an antioxidant and a copolymer.

The present invention also provides an adhesive composed of the composition, an adhesion method using the adhesive, and a bonded body adhered using the adhesive.

Effects of the Invention

The composition of the present invention exhibits high adhesiveness and high-speed curing property, and exhibits a high retention rate in durability tests including a high temperature high humidity test.

PREFERRED MODE FOR CARRYING OUT THE INVENTION

Component (A) is nitrile butadiene rubber (hereinafter referred to as "NBR"), and is preferably a solid NBR in terms of exhibiting excellent adhesion strength. In terms of exhibiting high retention rate in durability tests including the high temperature high humidity test, the content of acrylonitrile (hereinafter referred to as an "AN content") in the nitrile butadiene rubber is preferably 10 to 30% by mass and more preferably 13 to 20% by mass based on component (A). When AN content is 10% by mass or more, the effect of the present invention is easily obtained, and when it is 30% by mass or less, corrosion hardly occurs even when metal such as copper is an adherend subject.

Component (B) is a (meth)acrylic composition, and is preferably a composition containing a polymerizable (meth)acrylic compound. A (meth)acrylic compound is a general term for methacrylate ester and acrylate ester (hereinafter described as "-(meth)acrylate"). The polymerizable (meth)acrylic compound is not particularly limited as long as it is radical polymerizable, and may be exemplified by methyl (meth)acrylate, ethyl (meth)acrylate, propyl (meth)acrylate, butyl (meth)acrylate, 2-ethylhexyl (meth)acrylate, isooctyl (meth)acrylate, isodecyl (meth)acrylate, lauryl (meth)acrylate, stearyl (meth)acrylate, phenyl (meth)acrylate, cyclohexyl (meth)acrylate, dicyclopentanyl (meth)acrylate, dicyclopentenyl (meth)acrylate, isobornyl (meth)acrylate, methoxylated cyclotriene (meth)acrylate, dicyclopentenyloxyethyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, polyethylene glycol (meth)acrylate, alkyloxypolypropylene glycol (meth)acrylate, tetrahydrofurfuryl (meth)acrylate, 2-hydroxy-3-phenoxypropyl (meth)acrylate, glycidyl (meth)acrylate, caprolactone modified tetrafurfuryl (meth)acrylate, ethoxycarbonylmethyl (meth)acrylate, phenolethylene oxide modified acrylate, para-cumylphenol ethyleneoxy modified acrylate, nonylphenol ethylene oxide modified acrylate, nonylphenol polypropylene oxide modified acrylate, 2-ethylhexylcarbitol acrylate, polyglycerol di(meth)acrylate, polybutylene glycol di(meth)acrylate, 1,4-butanediol (meth)acrylate, 1,6-hexanediol di(meth)acrylate, neopentyl glycol di(meth)acrylate, trimethylolpropane tri(meth)acrylate, epoxy (meth)acrylate ("Biscoat #540" supplied from Osaka Organic Chemical Industry Ltd.), polyester (meth)acrylate ("Aronix M-6100" supplied from Toagosei Co., Ltd., "Epoxyester 3000M" supplied from Kyoei Kagaku Kogyo K.K.), urethane (meth)acrylate ("Aronix M-1100" supplied from Toagosei Co., Ltd.), polyethylene glycol urethane modified di(meth)acrylate, polypropylene glycol urethane modified di(meth)acrylate, epoxy (meth)acrylate ("Aronix M-5710" supplied from Toagosei Co., Ltd.), polybutadiene dimethacrylate ("TE-2000" supplied from Nippon Soda Co., Ltd.), acrylnitrile butadiene (meth)acrylate ("HγCAr VTBNX" supplied from Ube Industries Ltd.), benzyl (meth)acrylate, glycerol (meth)acrylate, glycerol di(meth)acrylate, phenoxydiethylene glycol (meth)acrylate, 2,2-bis(4-(meth)acryloxyphenyl)propane, 2,2-bis(4-(meth)acryloxydiethoxyphenyl)propane, 2,2-bis(4-(meth)acryloxyethoxyphenyl)propane, 2,2-bis(4-(meth)acryloxypropoxyphenyl)prone, 2,2-bis(4-(meth)acryloxytetraethoxyphenyl)propane, 2,2-bis[4-((meth)acryloxypolyethoxy)phenyl]propane, pentaerythritol tetra(meth)acrylate, dipentaerythritol hexa(meth)acrylate and the like.

The above (meth)acrylic compound can be used alone or in a mixture of two or more thereof. The (meth)acrylic composition preferably contains isobornyl (meth)acrylate, and more preferably contains one or two or more selected from the group consisting of isobornyl (meth)acrylate, (meth)acrylic acid, 2-2-bis[4-((meth)acrloxypolyethoxy)phenyl]propane, bis(4-(meth)acryloxyethoxyphenyl)propane and trimethylolpropane tri(meth)acrylate. When the (meth)acrylic composition contains isobornyl (meth) acrylate, (meth)acrylic acid, 2-2-bis[4-((meth)acryloxypolyethoxy)phenyl]propane, 2,2-bis(4-(meth)acryloxyethoxyphenyl)propane and trimethylolpropane tri(meth)acrylate, their contents are preferably 10 to 60% by mass of isobornyl (meth)acrylate, 1 to 30% by mass of (meth)acrylic acid, 1 to 20% by mass of 2-2-bis[4-((meth)acryloxypolyethoxy)phenyl]propane, 5 to 40% by mass of 2,2-bis(4-(meth)acryloxyethoxyphenyl)propane and 1 to 20% by mass of trimethylolpropane tri(meth)acrylate, and more preferably 15 to 55% by mass of isobornyl (meth)acrylate, 5 to 20% by mass of (meth)acrylic acid, 2 to 5% by mass of 2-2-bis[4-((meth)acryloxypolyethoxy)phenyl]propane, 10 to 30% by mass of 2,2-bis(4-(meth)acryloxyethoxyphenyl)propane and 2 to 5% by mass of trimethylolpropane tri(meth)acrylate in total 100% by mass of isobornyl (meth)acrylate, (meth)acrylic acid, 2-2-bis[4-((meth)acryloxypolyethoxy)phenyl]propane, 2,2-bis(4-(meth)acryloxyethoxyphenyl)propane and trimethylolpropane tri(meth)acrylate, in terms of exhibiting a high retention rate in durability tests including the high temperature high humidity test.

Component (C) is a compound having an enal structure, and is preferably one that enables promotion of high-speed curing. The compound having an enal structure may be exemplified by 2-ethyl-2-hexenal, 2-ethyl-1-hexene, 3-ethyl-3-hexene, trans-4-ethyl-2-hexene and the like. Among them, 2-ethyl-2-hexenal is preferable in terms of high-speed curing.

Component (D) is a compound having an amine structure. Component (D) is preferably a basic compound having an amine structure, which can react with component (C) and promote high-speed curing. The compound having an amine structure may be exemplified by aniline, polyaniline, benzotriazole, phenothiazine, saccharine, 1-acetyl-2-phenylhydrazine, polyethyleneimine, modified polyethyleneimine (supplied from Nippon Shokubai Co., Ltd.), N,N-dimethylaniline, modified dihydropyridine, 2-methylimidazole, 2-hydroxyethyl para-toluidine, ethanolamine, diethanolamine, diethylethanolamine, methyldiethanolamine, butyldiethanolamine, diethylamine, triethylamine, n-butylamine, 2,2-bipyridine, 1,10-phenanthroline, ammonia, alkylidene malonate ester, δ-iminomalonate ester, ethylazane, phenylamine, benzylamine, 1-benzofuran-2-amine, 4-quinolylamine, pentane-1,2,5-triamine, benzene-1,2,4,5-tetraamine, bis-(2-chloroethyl)-amine, butyl(ethyl)methylamine, (2-chloroethyl)-(propyl)-amine, hexane-1-imine, isopropylideneamine, etane-1,2-diimine, carbodiimide, o-acetylhydroxylamine, o-carboxyhydroxylamine, hydroxylamine-o-sulfonic acid, o-hydroxyaniline, hydrochloric acid phenylpropanolamine, catecholamine, indoleamine, polyacrylamine, dichlorohexyl carbodiimide, acetylthiourea, benzoylthiourea, 2-phenylhydrazine-1-carboaldehyde, 2,2,2-trifluoro-N'-phenylacetohydrazide, 1-crotonoyl-2-phenylhydrozine, 1-(2-carboxyacryloyl)-2-phenylhydrazine, 1-carbamoyl-2-phenylhydrazine, 1,4-diphenylthiosemicarbazide, 2,4-diphenylthiosemicarbazide, N,N'-diacetylthiourea, 2-thioxoimidazolidine-4-one, 1-acetyl-2-thiohydantoin and the like.

The compound having an amine structure can be used alone or in a mixture of two or more thereof, and aniline is preferable because reactivity with component (C) is high and very high-speed curing is promoted.

In the present invention, component (C) reacts with component (D) to produce an amine complex mixture, which promotes high-speed curing of the adhesive.

Component (E) is a compound containing copper. A reducing agent containing copper is preferable as component (E). A reducing agent containing copper may be exemplified by copper acetate, copper naphthenate, copper octylate, acetylacetone copper complex, copper sulfate, oxidized copper and the like.

The compound containing copper is preferably copper naphthenate and/or copper octylate because a stable copper catalyst is formed by coexistence with the amine complex reactant produced from component (C) and component (D).

Their contents are preferably 0.1 to 50% by mass of component (A), 10 to 95% by mass of component (B), 1 to 40% by mass of component (C), 0.1 to 40% by mass of component (D) and 0.01 to 5% by mass of component (E), and more preferably 1 to 10% by mass of component (A), 60 to 80% by mass of component (B), 2 to 10% by mass of component (C), 3 to 50% by mass of component (D) and 0.1 to 3% by mass of component (E) in the first preparation and the second preparation, respectively. This is because the adhesive is cured at high speed and exhibits high adhesion strength to adherends including metal.

Component (F) is a radical polymerization initiator. An organic peroxide is preferable among the radical polymerization initiators. The organic peroxide may be exemplified by cumene hydroperoxide, tertiary-butyl peroxybenzoate, tertiary-butyl peroxyacetate, tertiary-butyl peroxyisobutyrate, tertiary-butyl peroxyphthalate and the like. Cumene hydroperoxide is preferable among them in terms of large effects. It is preferable that a radical polymerization initiator is contained in the first preparation.

The content of the radical polymerization initiator is preferably 0.001 to 30 parts by mass, and more preferably 0.1 to 10 parts by mass based on 100 parts by mass of the first preparation.

The adhesive composition of the present invention can contain (G) a photopolymerization initiator for curing the portion of adhesive protruding from between the adherends, a cohesiveness imparting agent for enhancing cohesion between the adherends, and an antioxidant for enhancing storage stability.

The photopolymerization initiator may be exemplified by benzophenone, 4-phenylbenzophenone, benzyl, benzoin, benzoyl isopropyl ether, benzoyl benzoate, 2,2-diethoxyacetophenone, bis-diethylamino benzophenone, benzyldimethylketal, 1-hydroxycyclohexyl phenyl ketone, thioxanthone, 1-(4-isopropylphenyl)2-hydroxy-2-methylpropane-1-one, 1-(4-(2-hydroxyethoxy)-phenyl-2-methyl-1-propane-1-one, 2-hydroxy-2-methyl-1-phenylpropane-1-one, camphor quinone, 2,4,6-trimethylbenzoyl diphenylphosphine oxide, bis(2,4,6-trimethylbenzoyl)-phenylphosphine oxide, 2-methyl-1-(4-(methylthio)phenyl)-2-morpholinopropane-1-one, 2-benzyl-2-dimethylamino-1-(4-morpholinophenyl)-1-butanone-1-one, bis(2,6-dimethoxybenzoyl)-2,4,4-trimethylpentylphosphine oxide and the like. Benzyldimethylketal is preferable among them in terms of large effects. It is preferable that the photopolymerization initiator is contained in the first preparation.

The content of the photopolymerization initiator is preferably 0.001 to 30 parts by mass, more preferably 0.1 to 10 parts by mass, and most preferably 1 to 7 parts by mass based on 100 parts by mass of the first preparation.

The cohesiveness imparting agent may be exemplified by γ-chloropropyl trimethoxysilane, vinyl trimethoxysilane, vinyl trichlorosilane, vinyl triethoxysilane, vinyl-tris(β-methoxyethoxy)silane, γ-methacryloxypropyl trimethoxysilane, γ-acryloxypropyl trimethoxysilane, β-(3,4-epoxycyclohexyl)ethyl trimethoxysilane, γ-glycidoxypropyl trimethoxysilane, γ-mercaptopropyl trimethoxysilane, γ-aminopropyl triethoxysilane, N-β-(aminoethyl)-γ-aminopropyl trimethoxysilane, N-β-(aminoethyl)-γ-aminopropylmethyl dimethoxysilane, γ-ureidopropyl triethoxysilane, hydroxyethyl methacrylate phosphate ester, (2-hydroxyethyl)methacryl acid phosphate, methacryloxyoxyethyl acid phosphate, methacryloxyoxyethyl acid phosphate monoethylamine half salt and the like. Among them, one or two or more selected from the group consisting of (2-hydroxyethyl)methacryl acid phosphate, methacryloxyoxyethyl acid phosphate and methacryloxyoxyethyl acid phosphate monoethylamine half salt are preferable, and (2-hydroxyethyl)methacryl acid phosphate is more preferable in terms of adhesiveness to a metal adherend subject. It is preferable that the cohesiveness imparting agent is contained in both the first preparation and the second preparation.

The content of the cohesiveness imparting agent is preferably 0.001 to 10 parts by mass and more preferably 0.01 to 5 parts by mass based on 100 parts by mass of the first preparation or 100 parts by mass of the second preparation.

A phenol-based antioxidant is preferable as an antioxidant in terms of enhancing the storage stability. The phenol-based antioxidant may be exemplified by 1,3,5-trimethyl-2,4,6-tris (3,5-di-t-butyl-4-hydroxybenzyl)benzene, n-octadecyl-3-(3, 5-di-t-butyl-4-hydroxyphenyl)propionate, pentaerythrityl tetraxis[3-(3,5-di-t-butyl-4-hydroxyphenyl)propionate], triethylene glycol bis[3-(3-t-butyl-4-hydroxy-5-methylphenyl) propionate], 3,9-bis[2-{3-(3-t-butyl-4-hydroxy-5-methylphenyl)propionyloxy}-1,1-dimethylethyl]-2,4,8,10-tetraoxaspiro[5.5]undecane, tris(4-t-butyl-3-hydroxy-2,6-dimethylbenzyl)isocyanurate, 2,4-bis(n-octylthio)-6-(3,5-di-t-butyl-4-hydroxyanilino)-1,3,5-triazine, tris(3,5-di-t-butyl-4-hydroxybenzyl)isocyanurate, 2,2'-ethylidene bis(2,4-di-t-butylphenol), 2,6-di-t-butyl-4-methylphenol, 2,2'-methylene bis(4-methyl-6-t-butylphenol), 2,2'-ethylene bis(4-methyl-6-t-butylphenol) and the like. It is preferable that the antioxidant is contained in both the first preparation and the second preparation. Among them, 1,3,5-trimethyl-2,4,6-tris(3,5-di-t-butyl-4-hydroxybenzyl)benzene is preferable in terms of large effects.

The amount of the antioxidant is preferably 0.001 to 5 parts by mass and more preferably 0.01 to 3 parts by mass based on 100 parts by mass of the first preparation or 100 parts by mass of the second preparation.

The adhesive composition of the present invention can contain a copolymer in view of excellent adhesion strength. The copolymer may be exemplified by various elastomers such as acryl rubbers and urethane rubbers, and graft copolymers such as methyl methacrylate-butadiene-styrene-based graft copolymers and acrylonitrile-butadiene-styrene-based graft copolymers. Among them, acrylonitrile-butadiene-styrene-based graft copolymers and/or methyl methacrylate-butadiene-styrene-based graft copolymers are preferable, and methyl methacrylate-butadiene-styrene-based graft copolymers are more preferable in terms of exhibiting excellent properties. It is preferable that the copolymer is contained in both the first preparation and the second preparation.

The content of the copolymer is preferably 0.1 to 90 parts by mass, more preferably 5 to 70 parts by mass and most preferably 10 to 30 parts by mass based on 100 parts by mass of the first preparation or 100 parts by mass of the second preparation.

The adhesive composition of the present invention can contain additives such as an inorganic filler, a solvent, an extender, a reinforcing material, a plasticizer, a thickener, a dye, a pigment, a flame retardant and a surfactant in a range in which the object of the present invention is not impaired.

The adhesive composed of the composition of the present invention is cured in a short period of time by bring the first preparation into contact with the second preparation.

When two adherends are adhered using the adhesive of the present invention, it is preferable to apply the first preparation on one adherend, apply the second preparation on the other adherend and adhere by facing applied surfaces of the respective adherends toward each other because curing speed is fast. When the second preparation contains a volatile solvent, it is preferable to emit the volatile solvent, and subsequently adhere by facing the applied surfaces of the respective adherends toward each other. When a protruding portion and the like in which the first preparation is not in contact with the second preparation occurs in this method, the protruding portion can be cured by previously adding a photopolymerization initiator to the first preparation and irradiating the protruding portion with ultraviolet ray.

The adhesion method of the present invention can bond the adherends to each other in a very short period of time by reflecting characteristics of the above adhesive, and contribute to the enhancement and rationalization of productivity in various production lines.

The bonded body of the present invention reflects the characteristics of the above adhesive which exhibits high retention rate in durability tests including the high temperature high humidity test.

EXAMPLES

Examples 1 to 8, Comparative Examples 1 to 5

As shown in Table 1, components (A) to (G) and the other components were mixed at ratios in Table 1 to make a liquid adhesive composition.

Fixation time, tensile shear adhesion strength and moisture resistance of the composition containing the first preparation and the second preparation were measured by the following methods.

Fixation Time

The first preparation was applied on one test piece for measuring tensile shear strength, the second preparation was applied on the other test piece, and the test pieces were adhered by abutting the applied surface of the respective adherends. A time from after abutting the applied surfaces until the adherends could not be separated by applying a 4 kg load to the test piece was used as the fixation time.

Tensile Shear Adhesion Strength

An iron test piece having a thickness of 1.6 mm as the adherend (sandblast treatment) was adhered by the above method, and tensile shear adhesion strength measured using a tensile tester (a tensile speed: 10 mm/minute).

Moisture Resistance

The same test piece as in the measurement of the tensile shear adhesion strength was made, and subsequently left to stand in an atmosphere at a temperature of 60° C. and at a humidity of 90% for 500 hours. The test piece was removed, subsequently left to stand in a room under an atmosphere at 23° C. and at 50% RH for 30 minutes or more, and tensile shear adhesion strength measured.

Results of the above are shown in Table 1.
[Table 1]

TABLE 1

| | Component | Name | Example 1 | Example 2 | Example 3 | Example 4 | Example 5 | Example 6 | Example 7 | Comparative Example 1 | Comparative Example 2 | Comparative Example 3 | Example 8 | Comparative Example 4 | Comparative Example 5 |
|---|---|---|---|---|---|---|---|---|---|---|---|---|---|---|---|
| First solution | A | AN content 15% NBR (solid) | 4.9 | 4.9 | 4.9 | 4.9 | 4.9 | 4.9 | 4.9 | 4.9 | 4.9 | 4.9 | — | 4.9 | 4.9 |
| | A | AN content 41% NBR (solid) | — | — | — | — | — | — | — | — | — | — | 4.9 | — | — |
| | B | Isobornyl methacrylate | 37.4 | 37.4 | 37.4 | 37.4 | 37.4 | 37.4 | 37.4 | 37.4 | 37.4 | 37.4 | 37.4 | — | — |
| | B | Methacrylic acid | 8.1 | 8.1 | 8.1 | 8.1 | 8.1 | 8.1 | 8.1 | 8.1 | 8.1 | 8.1 | 8.1 | — | 8.1 |
| | B | 2,2-Bis[4-(methacryloxyethoxyphenyl)]propane | 2.7 | 2.7 | 2.7 | 2.7 | 2.7 | 2.7 | 2.7 | 2.7 | 2.7 | 2.7 | 2.7 | — | 2.7 |
| | B | 2,2-Bis[4-(methacryloxypolyethoxy)phenyl]propane | 19 | 19 | 19 | 19 | 19 | 19 | 19 | 19 | 19 | 19 | 19 | — | 29 |
| | B | 2-Hydroxyethyl methacrylate | — | — | — | — | — | — | — | — | — | — | — | 40.0 | — |
| | B | Dicyclopentenyloxyethyl methacrylate | — | — | — | — | — | — | — | — | — | — | — | 30 | — |
| | B | Trimethylolpropane trimethacrylate | 2.7 | 2.7 | 2.7 | 2.7 | 2.7 | 2.7 | 2.7 | 2.7 | 2.7 | 2.7 | 2.7 | — | 2.7 |
| | C | 2-Ethyl-2-hexenal | 7.5 | — | 3.8 | — | 7.5 | 7.5 | 7.5 | 7.5 | — | 7.5 | 7.5 | 7.5 | 7.5 |
| | D | Aniline | — | — | — | 9.6 | — | — | — | — | — | — | — | — | — |
| | G | Benzyldimethylketal | — | — | — | — | 3.0 | 3.0 | — | — | — | — | — | — | — |
| | Additives | 1,3,5-Trimethyl-2,4,6-tris(3,5-di-t-butyl-4-hydroxybenzyl)benzene | 1.2 | 1.2 | 1.2 | 1.2 | 1.2 | 1.2 | 1.2 | 1.2 | 1.2 | 1.2 | 1.2 | 1.2 | 1.2 |
| | | | 0.4 | 0.4 | 0.4 | 0.4 | 0.4 | 0.4 | 0.4 | 0.4 | 0.4 | 0.4 | 0.4 | 0.4 | 0.4 |
| | F | Cumene hydroperoxide | — | 19.2 | — | — | — | — | 4.0 | — | — | — | 4.0 | — | — |
| | Others | AN/BD/ST-based graft copolymer | 4.0 | 4.0 | 4.0 | 4.0 | 4.0 | 4.0 | 12.1 | — | — | — | — | — | — |
| | Others | butadiene/MMA/ST copolymer | — | — | — | — | — | — | — | — | — | — | — | — | — |
| Second solution | A | AN content 15% NBR (solid) | 12.1 | 12.1 | 12.1 | 12.1 | 12.1 | 12.1 | 12.1 | 12.1 | 12.1 | 12.1 | 12.1 | 12.1 | 12.1 |
| | A | AN content 41% NBR (solid) | 4.5 | 4.5 | 4.5 | 4.5 | 4.5 | 4.5 | 4.5 | 4.5 | 4.5 | 4.5 | 4.5 | 4.5 | 4.5 |
| | B | Isobornyl methacrylate | 34.6 | 34.6 | 34.6 | 34.6 | 34.6 | 34.6 | 34.6 | 34.6 | 34.6 | 34.6 | 34.6 | — | — |
| | B | Methacrylic acid | 7.5 | 7.5 | 7.5 | 7.5 | 7.5 | 7.5 | 7.5 | 7.5 | 7.5 | 7.5 | 7.5 | — | 7.5 |
| | B | 2,2-Bis[4-(methacryloxyethoxyphenyl)]propane | 2.5 | 2.5 | 2.5 | 2.5 | 2.5 | 2.5 | 2.5 | 2.5 | 2.5 | 2.5 | 2.5 | — | 2.5 |
| | B | 2,2-Bis[4-(methacryloxypolyethoxy)phenyl]propane | 17.6 | 17.6 | 17.6 | 17.6 | 17.6 | 17.6 | 17.6 | 17.6 | 17.6 | 17.6 | 17.6 | — | 17.6 |
| | B | 2-Hydroxyethyl methacrylate | — | — | — | — | — | — | — | — | — | — | — | 40.0 | — |
| | B | Dicyclopentenyloxyethyl methacrylate | — | — | — | — | — | — | — | — | — | — | — | 30 | — |
| | B | Trimethylolpropane trimethacrylate | — | — | — | — | — | — | — | — | — | — | — | — | — |
| | C | 2-Ethyl-2-hexenal | 2.5 | 2.5 | 2.5 | 2.5 | 2.5 | 2.5 | 2.5 | 2.5 | 2.5 | 2.5 | 2.5 | — | 2.5 |
| | D | Aniline | 17.9 | 9.3 | 11.9 | 4.7 | — | 23.8 | 17.9 | — | 23.8 | 23.8 | 23.8 | 23.8 | 5.0 |
| | E | Copper octylate | — | — | — | — | 23.8 | 0.4 | — | — | — | — | — | — | 5.0 |
| | E | Copper naphthenate (copper content: 5%) | 0.4 | 0.4 | 0.4 | 0.4 | 0.4 | — | 0.4 | 0.4 | 0.4 | 0.4 | 0.4 | 0.4 | 0.4 |
| | Additives | (2-Hydroxyethyl)methacryl acid phosphate | 1.4 | 1.4 | 1.4 | 1.4 | 1.4 | 1.4 | 1.4 | 1.4 | 1.4 | 1.4 | 1.4 | 1.4 | 1.4 |
| | Additives | 1,3,5-Trimethyl-2,4,6-tris(3,5-di-t-butyl-4-hydroxybenzyl)benzene | 0.4 | 0.4 | 0.4 | 0.4 | 0.4 | 0.4 | 0.4 | 0.4 | 0.4 | 0.4 | 0.4 | 0.4 | 0.4 |
| | Others | AN/BD/ST-based graft copolymer | 11.2 | 11.2 | 11.2 | 11.2 | 11.2 | 11.2 | 11.2 | 11.2 | 11.2 | 11.2 | 11.2 | 11.2 | 11.2 |
| | Others | butadiene/MMA/ST copolymer | | | | | | | | | | | | | |
| | | Fixation time | 10 seconds or less | 10 seconds or less | 10 seconds or less | 15 seconds | 15 seconds | 15 seconds | 15 seconds | Uncured | Uncured | 2 hours or more | 10 seconds or less | 2 hours or more | 2 hours or more |
| | | Tensile shear adhesion | 21 MPa | 21 MPa | 21 MPa | 19 MPa | 19 MPa | 19 MPa | 21 MPa | 0 MPa | 0 MPa | 0 MPa | 21 MPa | 0 MPa | 5 MPa |
| | | Tensile shear adhesion strength (耐湿性) | 20 MPa | 20 MPa | 20 MPa | 18 MPa | 18 MPa | 18 MPa | 20 MPa | 0 MPa | 0 MPa | 0 MPa | 5 MPa | 0 MPa | 2 MPa |

The butadiene/MMA/ST copolymer is an abbreviation of the methyl methacrylate-butadiene-styrene-based graft copolymer.
The AN/BD/ST copolymer is an abbreviation of the acrylonitrile-butadiene-styrene copolymer.

From Table 1, it has been found that the compositions of Examples are high-speed curing type adhesives which exhibit high adhesiveness and moisture resistance. It has been also found that moisture resistance is further enhanced by making the content of acrylnitrile in the nitrile butadiene rubber 10 to 30% by mass based on nitrile butadiene rubber (comparison of Example 1 with Example 8).

INDUSTRIAL APPLICABILITY

The adhesive of the present invention exhibits an extremely quick curing reaction at ambient temperature, excellent adhesiveness and moisture resistance, and thus, is very useful in industry as it is applicable to various production lines to enable shortening or rationalization of production time.

The invention claimed is:

1. A composition comprising: a first preparation containing (A) a nitrile butadiene rubber, (B) a (meth)acrylic composition, (C) a compound having an enal structure and (F) a radical polymerization initiator; and a second preparation containing (A) the nitrile butadiene rubber, (B) the (meth)acrylic composition, (D) a compound having an amine structure and (E) a compound containing copper.

2. A composition comprising: a first preparation containing (A) a nitrile butadiene rubber, (B) a (meth)acrylic composition, (D) a compound having an amine structure and (F) a radical polymerization initiator; and a second preparation containing (A) the nitrile butadiene rubber, (B) the (meth)acrylic composition, (C) a compound having an enal structure and (E) a compound containing copper.

3. The composition according to claim 1, wherein the first preparation further contains (G) a photopolymerization initiator.

4. The composition according to claim 1, wherein a content of acrylonitrile in the component (A) is 10 to 30% by mass based on the component (A).

5. The composition according to claim 1, wherein the component (B) contains one or two or more selected from the group consisting of isobornyl (meth)acrylate, (meth)acrylic acid, 2,2-bis[4-((meth)acryloxypolyethoxyphenyl)propane, 2,2-bis(4-(meth)acryloxyethoxyphenyl)propane and trimethylolpropane tri(meth)acrylate.

6. The composition according to claim 5, wherein the component (B) contains isobornyl (meth)acrylate.

7. The composition according to claim 1, wherein the component (C) is 2-ethyl-2-hexenal.

8. The composition according to claim 1, wherein the component (D) is aniline.

9. The composition according to claim 1, wherein the component (E) is a reducing agent containing copper.

10. The composition according to claim 1, further comprising a cohesiveness imparting agent.

11. The composition according to claim 1, further comprising an antioxidant.

12. The composition according to claim 1, further comprising a copolymer.

13. An adhesive composed of the composition according to claim 1.

14. An adhesion method using the adhesive according to claim 13.

15. A bonded body adhered using the adhesive according to claim 13.

16. The composition according to claim 2, wherein the first preparation further contains (G) a photopolymerization initiator.

17. The composition according to claim 2, wherein a content of acrylonitrile in the component (A) is 10 to 30% by mass based on the component (A).

18. The composition according to claim 2, further comprising a cohesiveness imparting agent.

19. The composition according to claim 2, further comprising an antioxidant.

20. The composition according to claim 2, further comprising a copolymer.

* * * * *